Patented Sept. 9, 1952

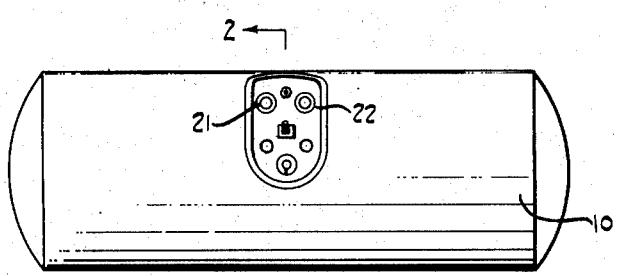
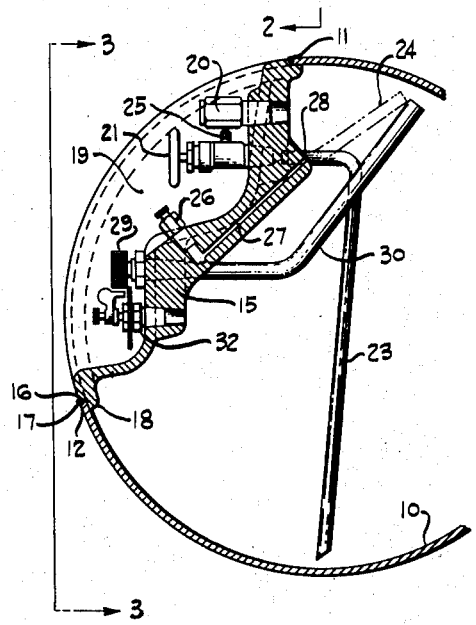
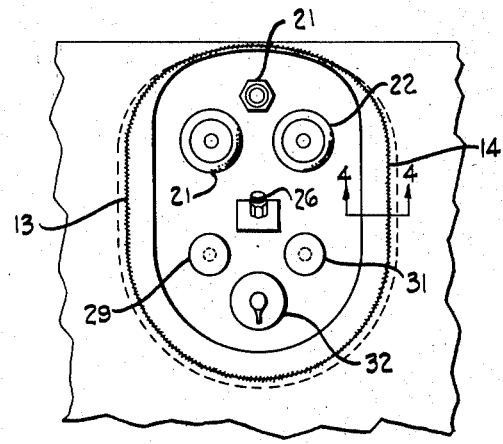
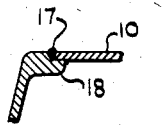

2,609,964

UNITED STATES PATENT OFFICE 2,609,964

RECESS MOUNTING FOR VALVES AND FITTINGS FOR LIQUEFIED PETROLEUM GAS CONTAINERS

Ralph K. Cadwell, Los Angeles, Calif., assignor to American Pipe & Steel Corporation, Alhambra, Calif., a corporation of Nevada Application April 4, 1947, Serial No. 739,500

2 Claims. (Cl. 220—85)

This invention relates to a mounting for installing or mounting various valves and fittings in the wall of a tank or container designed to contain a liquefied petroleum gas such as propane or butane.

Liquefied petroleum gas such as butane is now being frequently used as the fuel on trucks and frequently is carried in a tank mounted on the side of the chassis of the truck and frequently covered by the body or floor. With such installations the various valves and fittings used to refill the tank and to control egress therefrom must be readily available or accessible from the side of the truck. However, there is a constant danger that if the truck should become "sideswiped" that one or more of the fittings or valves may become broken or damaged and as the liquefied petroleum contained in the tank is highly combustible and is retained therein under pressure at all times such accidents invariably result in serious fires.

It is, therefore, one object of the present invention to provide an improved tank suitable for containing liquefied petroleum gases wherein all of the valves and fittings required are mounted on a mounting that is externally recessed within the general or overall contour of the tank so that no portions of these various valves and fittings will be projecting beyond the general contour of the tank wall. In this manner the valves and fittings are to a large extent protected by the tank itself so that they cannot be easily damaged or broken off. At the same time all of these valves and fittings will be rendered readily accessible from the side of the truck.

Tanks designed to contain liquefied petroleum gases are usually equipped with certain valves leading to certain locations within the tank. Thus virtually all tanks designed to contain liquefied petroleum gases have a "ten percent outage valve" that controls a conduit leading to a point approximately ten percent of the volumetric capacity of the tank from the top. In filling the tank with a liquefied petroleum gas it is essential to maintain a vapor space above the liquefied petroleum approximately equal to ten percent of the total volumetric capacity of the tank to take care of temperature expansion. Usually also there is a liquid filling valve by which the tank may be refilled and a vapor return valve that controls a conduit leading to the vapor space in the top of the tank. Almost universally there is a safety valve and usually a liquid level gage. Egress from the tank may be controlled by an outlet valve and in some instances there are two outlet valves one of which controls an outlet for vapor from the vapor space in the tank and the other of which controls an outlet through a tube leading to the bottom of the tank. In this manner either vaporized or liquid fuel can be withdrawn from the tank depending on which is desired.

It is another object of the present invention to provide a single mounting on which all of the various valves and fittings together with their conduits that they respectively control may be mounted and installed as a unit so that when installed on the tank all of the various conduits leading to the various valves will be properly positioned with respect to the tank.

Tanks of this character designed to contain liquefied petroleum gases must comply or conform to a certain regulation or safety code particularly with relation to welded joints or seams some of which require that with certain types of welding the welds be formed not only externally of the tank but internally of the tank. In a tank of this character which is relatively small the formation of internal welds in the tank between and around the various tubes would be extremely difficult if possible and it is, therefore, another object of the invention to design a mounting for liquefied petroleum tanks on which all of the various tubes, valves, and fittings may be mounted and which can be applied to the tank in such a manner that only an external weld is required. At the same time the tank and its installed mounting will comply with all ordinary safety codes and will effectively prevent leakage at the welded seam.

Another object of the invention is to provide a mounting for mounting the various valves and fittings and tubes associated therewith to be installed as a unitary structure in a liquefied petroleum gas tank which is so designed that the mounting may be inserted into the tank from the exterior as a unit and on being properly positioned therein it will have a back-up flange around all edges of the mounting against which external welding may take place and which is so designed that the points of welding are sufficiently remote from the various valves and fittings that distortion of the mounting around the valves and fittings will not take place to any marked extent.

With the foregoing and other objects in view, which will be made manifest in the following detailed construction, and specifically pointed out in the appended claims, reference is had to the accompanying drawings for an illustrative embodiment of the invention, wherein:

Figure 1 is a view in side elevation of a liquid for petroleum gas tanks embodying the present invention;

Fig. 2 is a vertical section taken substantially upon the line 2—2 upon Fig. 1 in the direction indicated on a larger scale;

Fig. 3 is a partial view of the exterior of the tank illustrating the mounting embodying the present invention; and Fig. 4 is a partial view in section taken substantially upon the line 4—4 upon Fig. 3.

Referring to the accompanying drawings wherein similar reference characters designate similar parts throughout, 10 indicates a generally cylindrical tank which may be constructed in accordance with any preferred or conventional design. This tank is designed and adapted to contain a liquefied petroleum gas and if used for supplying fuel to the engines of motor trucks it may be suitably mounted on the side of the chassis of the truck. In the cylindrical wall of this tank there is formed an oblong opening the top and bottom edges of which are indicated at 11 and 12 and the side edges of which are indicated at 13 and 14. This opening may vary somewhat in size but in the preferred form of construction it extends through a 90° arc of the cylindrical wall of the tank.

The mounting embodying the present invention consists of a stamping, casting or forging indicated at 15, the top, bottom and side edges of which are shaped to fit the edges of the opening. This mounting presents around its periphery a shoulder 16 designed to cooperate with the edges of the tank wall to form a welding space to receive an external weld 17. The mounting also has adjacent the shoulder 16 a back-up flange 18 that extends entirely around the edge of the mounting and is adapted to abut against the tank wall immediately adjacent the edges of the opening. The mounting is so shaped within its edges that when in applied position on the tank wall it will be externally recessed as generally indicated at 19. This recess is sufficiently deep with respect to the general contour of the cylindrical wall of the tank to accommodate all of the various valves and fittings and parts thereof so that as illustrated in Fig. 2 all of the various fittings mounted on the mounting 15 are well within the recess 19 and within the general contour of the tank wall so as to be effectively protected thereby. At the same time all of these various valves and fittings are readily accessible through the front of the recess and are in effect exposed for availability on the side wall of the tank.

In the construction illustrated 20 indicates a safety valve that is screwed into the mounting 15 adjacent the top thereof and which is designed to relieve the tank when its internal pressure becomes excessive. Below this safety valve there may be two outlet valves indicated at 21 and 22. The valve 21 may be connected to a dip tube 23 that is soldered, brazed, or welded to the inner side of the mounting 15 and which extends downwardly to a point near the bottom of the tank. The other outlet valve 22 may be connected to a tube 24 that extends to a point near the top of the tank so as to be well within the vapor space thereof. Such tube is illustrated in phantom lines on Fig. 2. These outlet valves may be optionally used depending on whether the fuel employed is in the nature of a liquid or a gas. In other words, if the carburetor of the truck engine is designed to handle gaseous fuel a supply pipe leading thereto is connected to the valve 22 which receives gas from the top of the tank through the tube 24. Conversely, if the carburetor is designed to handle liquid fuel the line leading therein may be connected to the liquid outlet valve 21 such as to the outlet nipple 25. 26 indicates a ten percent outage valve which controls a passage or conduit 27 that may be formed in the wall of the mounting 15 itself and which leads upwardly to a point 28 that is approximately ten percent, volumetrically speaking, from the top of the tank. This ten percent outage valve in conformity with tanks of this general character is designed to indicate a level within the tank above which the liquid level cannot exceed. 29 indicates a vapor return valve which controls a tube or conduit 30 that likewise returns to the vapor space or to the top of the tank. 31 indicates a filling valve by which the tank may be refilled from time to time. The vapor return valve 29 together with its tube 30 provides a means for withdrawing gas from the tank as it is being refilled with liquid. 32 indicates a liquid level indicator for indicating the level of the liquid in the tank as it is withdrawn therefrom.

All of these various valves or fittings together with the tubes leading thereto may be mounted on the mounting 15 prior to installation of the mounting on the tank. The valves and fittings may be screwed tightly into their respective apertures in the mounting 15 and the various tubes attached thereto such as by welding, brazing or silver soldering. When the mounting and its various tubes, valves and fittings have all been assembled together the mounting as a single unitary structure may be inserted through the opening in the tank wall 10. Some tipping of the mounting is required during this insertion but the mounting may be bodily inserted through the opening due to the fact that the opening extends a sufficient distance circumferentially around the wall of the tank. After it has been completely inserted through the opening the mounting is then withdrawn or moved outwardly until its back-up flanges 18 bear against the interior surface of the tank walls around the margins of the opening. When held seated in this position all of the various valves and fittings together with their tubes will be properly positioned with relation to the tank. The welds 17 may then be formed between the edges of the opening and the circumferential or peripheral face of shoulder 16. These welds are all externally formed and due to the presence of the back-up flanges at 18 are sufficient to comply with all ordinary safety codes.

Even though there may be a great internal pressure within the tank the mounting 15 will not be distorted thereby nor will the joint between the edges of the opening and the mounting be opened or weakened.

Various changes may be made in the details of construction without departing from the spirit and scope of the invention as defined by the appended claims.

I claim:

1. A tank having a cylindrical wall, there being an elongated opening in said wall extending about 90° of the curvature of the wall, a mounting fitting receivable through the opening from the exterior thereof, said mounting fitting having a back-up flange extending entirely therearound adapted to bear against the interior surfaces of the walls of the tank adjacent the edges of the opening, said mounting fitting having a shoulder extending entirely therearound inwardly of the back-up flange adapted to be positioned opposite the edges of the opening in spaced relation thereto to provide a groove between the shoulder and the edges of the opening to receive a weld, the shoulder being substantially flush with the outer surfaces of the tank, external welds between the shoulder and the edges of the opening, and one or more valves on the mounting fitting providing for communication therethrough to the interior of the tank, said mounting fitting being characterized by being externally recessed within the edges of the opening so that the valves thereon will be disposed within the general external contour of the tank.

2. A tank having a cylindrical wall, there being an elongated opening in the wall extending approximately 90° of the curvature of the wall, a mounting fitting shaped to fit the opening and having a back-up flange extending entirely therearound and adapted to bear against the interior surfaces of the walls of the tank adjacent the edges of the opening, said back-up flange having a peripheral distance greater than the distance around the edges of the opening but said fitting being receivable through the opening from the exterior of the tank by tilting the fitting and inserting it into the tank with a narrow side foremost, said mounting fitting having a shoulder extending entirely therearound inwardly of the back-up flange adapted to be positioned opposite the edges of the opening in spaced relation thereto to provide a groove between the shoulder and the edges of the opening to receive a weld, external welds between the shoulder and the edges of the opening, and one or more valves on the mounting fitting providing for communication therethrough to the interior of the tank, said mounting fitting being characterized by being externally recessed within the edges of the opening so that the valves thereon will be disposed within the general external contour of the tank.

RALPH K. CADWELL.

REFERENCES CITED

The following references are of record in the file of this patent:

UNITED STATES PATENTS

| Number | Name | Date |
|---|---|---|
| 470,838 | Hart | Mar. 15, 1892 |
| 521,113 | Hart | June 5, 1894 |
| 1,572,727 | Kerr | Feb. 9, 1926 |
| 1,842,298 | Smith | Jan. 19, 1932 |
| 1,966,241 | Furrer | July 10, 1934 |
| 2,064,123 | Kruse | Dec. 15, 1936 |
| 2,113,060 | Sandberg | Apr. 5, 1938 |
| 2,356,047 | Geisinger et al. | Aug. 15, 1944 |

FOREIGN PATENTS

| Number | Country | Date |
|---|---|---|
| 706,054 | Germany | May 16, 1941 |